United States Patent [19]

Pascoe et al.

[11] Patent Number: 5,535,319
[45] Date of Patent: Jul. 9, 1996

[54] METHOD OF CREATING AND DETECTING DEVICE INDEPENDENT CONTROLS IN A PRESENTATION DATA STREAM

[75] Inventors: Robert A. Pascoe, Grapevine; David L. Ehnebuske, Irving, both of Tex.

[73] Assignee: International Business Machines Corporation, Armonk, N.Y.

[21] Appl. No.: 509,261

[22] Filed: Apr. 13, 1990

[51] Int. Cl.⁶ .................................................. G06F 17/22
[52] U.S. Cl. ............................................................. 395/148
[58] Field of Search .................................... 395/100, 118, 395/275, 155, 157, 161, 148; 358/138

[56] References Cited

U.S. PATENT DOCUMENTS

| | | | |
|---|---|---|---|
| 4,388,696 | 6/1983 | Test, II et al. | 364/900 |
| 4,644,401 | 2/1987 | Gaskins | 358/183 |
| 4,872,054 | 10/1989 | Gray et al. | 358/140 |

*Primary Examiner*—Mark K. Zimmerman
*Attorney, Agent, or Firm*—Edward H. Duffield; David A. Mims

[57] ABSTRACT

A method of creating a graphical presentation data stream having special controls/hints which are device independent and permit text to be processed at higher speeds. The special controls/hints are added to the graphical presentation data stream to identify where limitations have been made for text presentation. A begin data characteristic control is added to the graphical presentation data stream to indicate the start of limitations. The limitations remain in effect until an associated end data characteristic control is encountered. An identification field is part of each begin/end characteristic control. The identification field defines the specific process used to generate the delimited portion of the data stream.

5 Claims, 6 Drawing Sheets

FIG. 1

THIS IS AN EXAMPLE OF THE FORMATTED

OUTPUT OF A TEXT PROCESS USING UNDERSCORE

AND BOX HIGHLIGHTING TECHNIQUES.

FIG. 2

[BEGIN GRAPHICS DATA

( BEGIN DATA CHARACTERISTIC {TEXT})

( CHARACTER STRING {X=1,Y=1}{THIS IS AN EXAMPLE OF THE

FORMATTED})

( CHARACTER STRING {X=1,Y=3} {OUTPUT OF A TEXT PROCESS USING})

( BEGIN DATA CHARACTERISTIC {UNDERSCORE})

( CHARACTER STRING {X=32,Y=3}{UNDERSCORE})

( GRAPHICS LINE FROM {X=32,Y=4}, TO {X=41,Y=4})

( END DATA CHARACTERISTIC {UNDERSCORE})

( CHARACTER STRING {X=1,Y=5}{AND BOX HIGHLIGHTING

TECHNIQUES})

( END DATA CHARACTERISTICS {TEXT})

( GRAPHICS LINE FROM {X=5,Y=6}, TO {X=5,Y=4})

( GRAPHICS LINE FROM {X=5,Y=4}, TO {X=22,Y=4})

( GRAPHICS LINE FROM {X=22,Y=4}, TO {X=22,Y=6})

( GRAPHICS LINE FROM {X=22,Y=6}, TO {X=5,Y=6})]

METHOD OF CREATING AND DETECTING DEVICE INDEPENDENT CONTROLS IN A PRESENTATION DATA STREAM

FIELD OF THE INVENTION

This invention relates to data processing systems in general and more particularly to a system and technique in which text, vector graphics, and raster image data are formatted into a standard presentation format which is subsequently shared by several applications and presentation devices.

BACKGROUND OF THE INVENTION

Within conventional information processing systems, information may be formatted by an application into a presentation format called a data stream. As utilized herein, a data stream is a collection of structured fields and is defined by the syntax and semantics of the structured fields. The presentation data stream may then be presented on a display, plotter or printer, stored on a storage medium, or electronically forwarded to another computer system where it may be stored, processed or presented by the local applications or devices. In an environment where the presentation data is to be shared by multiple applications and systems, or presented on several, different presentation devices, it is a requirement that resulting presentations look identical regardless of the device or application that processes it. A data stream that supports this requirement is called device independent. The device independent data stream assures that the information will be processable by all receiving applications and devices, with predictable results, regardless of the receiving application or device.

Another requirement for defining shared presentation data streams is to reduce the content to a small, common set. For example, text presentations may be represented in a vector graphics data stream using character string graphics controls. It is not necessary to have both a presentation text data stream and a presentation vector graphics data stream when it is possible to have a single data stream definition which supports both definitions. The value in this combined definition is a reduction in amount of code required by receiving applications and presentation devices for interpreting the presentation data stream. This can reduce development, maintenance and product costs.

Examples of the device independent, reduced content data stream are the International Standard Computer Graphics Metafile (CGM) and the IBM Graphics Object Content Architecture (GOCA). Implementations such as IBM's Presentation Manager and Adobe's PostScript demonstrate that the definition of text and raster image data can be accommodated in a graphical base. An application creates an instance of the data stream using a limited set of available commands. The limitations used are based upon the generating application focus. As pointed out above, a text application may use the graphics data stream controls to represent its output by limiting the set of controls used to those needed to represent the text (i.e., Character String controls).

However, data streams that are device independent and capable of reduced content presentation have disadvantages. These data streams tend to be the least common denominator of the functions supported by all existing applications or devices. Therefore, the function described in the data stream is limited to only those functions supported in common by all applications and devices. This does not support device adaptability, which is the ability to support device-specific performance and functional enhancements. The result is limited through-put, reduced presentation flexibility and quality, or lower over all performance.

Consider the example used earlier of representing presentation text in a vector graphics data stream using character string graphics controls. It is evident that a text-only presentation page may be represented with these graphics controls. However, since it is represented in a graphics data stream, the receiver is not aware that it was produced by a text function. The receiver must process the data stream as graphics. The result will be an accurate representation of the text application's original presentation, however, there may have been a performance overhead associated with processing these controls as graphics. For example, there are many printing devices which have both text and graphics modes. Due to the simplicity in processing the limited text functions as compared to the richer graphical functions, these printers are faster in text mode than in graphics mode. Without knowledge of the generators reference, the appropriate mode can not be selected.

It has been proposed that the receiving application or device interrogate the incoming presentation data stream to determine if certain limitations have been used in the generation of the presentation data stream which may be used to the advantage of the receiving application or device. For example, if a page of presentation data contains only character string controls, text mode may be assumed for the output of that page, thus enhancing performance. This approach could be further extended such that blocks of character string information contained in a graphics representation of a single page may be isolated and these blocks presented in the higher performance text mode. This exploratory approach is known as a heuristic method and exhibits the following disadvantages.

First, text information is not limited to just character data. For example, underscored text characters may be specified using graphical line drawing controls issued with the appropriate relationship to the character string controls. These and other limited combinations of graphical data by generating applications will complicate the heuristic method by requiring knowledge and an ability to handle multiple combinations of controls.

Second, because of the complexities of compound document presentations, there may be cases where the limitation on the use of the graphical data may not be guaranteed, and the results of the heuristic method is not predictable. For example, one portion of a data stream may be limited to character string controls and therefore can be determined to be a text block. A related portion of the same data stream may have character string controls which have been layered over a graphical drawing. Since this latter portion contains character string as well as other graphics controls representing the background drawing, it does not meet the limited definition of the heuristic method and therefore will not be treated as text. This will not result in maximum performance, as some portion of the presentation which could be processed in text mode will not be. Also, differing font rotation and font substitution rules may exist between text and graphics modes in presentation devices further invalidating the limited definition requirements of a heuristic method. This problem is further exacerbated when related character string data may be presented in unrelated font faces or orientations. Therefore, there are valid combinations of graphics controls which will invalidate a heuristic approach. This will cause the heuristic algorithm to be inaccurate or increase the cost of the heuristic implementation such that it is not practical.

Third, the heuristic approach requires that the presentation data stream be pre-processed in order to identify where generator limitations have been applied. This is only possible for devices which have page buffering capability to store the inbound presentation data stream while the heuristic algorithm is processed. Therefore, devices without page buffering can not support the heuristic approach.

In conclusion, the heuristic approach is complex, has questionable accuracy, and is not implementable in all device and application classes. What is needed is a technique by which an originating application can explicitly specify that presentation data, or segments of presentation data, were generated using a specific process. The resulting limited ordering of the presentation data stream contents could be processed by a device specific mode or function without loss of presentation integrity.

SUMMARY OF THE INVENTION

This invention relates to a method of providing controls (hints) in a graphical presentation data stream such as the IBM Graphics Object Content Architecture, that enables a generation process to identify where certain limitations have been used in the generation of specific instances of the presentation data stream. These controls (hints) do not modify the description of the presentation. Rather they provide a means for a receiver to explicitly determine where limitations have been used by the generation process, and thus which of a set of presentation processes may be effectively applied to the presentation data stream to assure the highest performance and greatest accuracy associated with the processing of the presentation data.

A Begin Data Characteristic control and an End Data Characteristic control are provided in the presentation data stream during the generation process. The Begin Data Characteristic and End Data Characteristic controls are positioned in the presentation data stream to delimit that section of the data stream which has a specific characteristic. Each Begin Data Characteristic control and End Data Characteristic control is provided with an identification (ID) field. The ID field is used to define the specific process used to generate the delimited portion of the data stream. The receiving application or device (receiver) may modify the presentation process if it recognizes a specific Begin Data Characteristic control. The modification process will remain in effect until the associated End Data Characteristic control is encountered. A receiving device may ignore the Begin Data Characteristic and End Data Characteristic controls and be assured that the resulting presentation will be accurate and compliant with the generators specification. The controls eliminate the need for heuristics, because they explicitly specify where generator limitations have been applied. In addition, device independence is achieved because the controls do not specify a specific process or device function. Furthermore, device adaptability is achieved because the controls allow the receiving process to alter the presentation process to account for device-specific functionality.

The Begin Data characteristic and End Data Characteristic controls do not change the resulting presentation view. A process which supports no hints will generate the same output as a process which supports any and all hints. The difference between these two processes will be in the speed and quality in which the presentation is created on the output device.

Support for the Begin Data Characteristic and End Data Characteristic controls is optional, as the same physical presentation will result with or without support. Support by a receiving device is dependent on the abilities of that device to adapt its presentation process based on the generation limitations identified by and delimited by the Begin Data Characteristic and End Data Characteristic controls.

The ID of the Begin Data Characteristic and End Data Characteristic controls provides flexibility in assigning hints to data stream interpretation. A registry of IDs is assumed. As new generators determine new limitations on output data streams, and new devices find ways to adapt to these limitations, Begin Data Characteristic and End Data Characteristic controls with new IDs may be added by the generator. Existing devices will ignore these new Begin/End Data Characteristics. The presentation results will be identical, only performance and quality will be affected.

DETAILED DESCRIPTION

Figure 1:
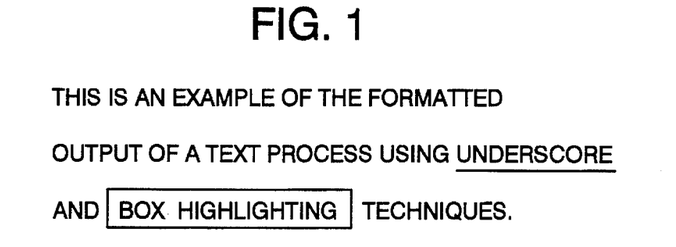
FIG. 1 is a representation of the presentation created by a text processor.

In a text processing application, there is a requirement to represent the results of the text processing application using a graphics based presentation data stream such as the IBM Graphics Object Content Architecture. It is a further requirement that the text processing application use only a subset of the graphics controls available in the data stream. The text processing application has three functions; it represents text information, it can highlight text information with an underscore, it can highlight text information by drawing a box around it. Text will be represented by Character String controls, and underscore information will be represented by Graphics Line controls appropriately positioned below the text to be underlined. The box function will be represented in the data stream again using Graphic Line controls appropriately placed in relation to the associated Character String controls. An example of an output that can be created by this text processor is shown in FIG. 1.

It is determined that there are three classes of printer which will receive the output of the text processor. Printer class 'A' supports a graphics mode and high performance text mode. Printer class 'B' has graphics and text modes, and in addition provides an underscore function as an integral part of the font definition of the printer. Finally, printer class 'C' has only a graphics mode. To achieve maximum performance and quality, it is desirable that class 'A' printers shift into text mode for processing Character String controls, but will process Graphics Line controls as a function of graphics mode. It is further desirable for class 'B' printers to process the Character String controls and the Graphics Line controls associated with underscore in the text mode. It is further desirable that output of the text processor be processed 'as is' by class 'C' printers.

Figure 2:
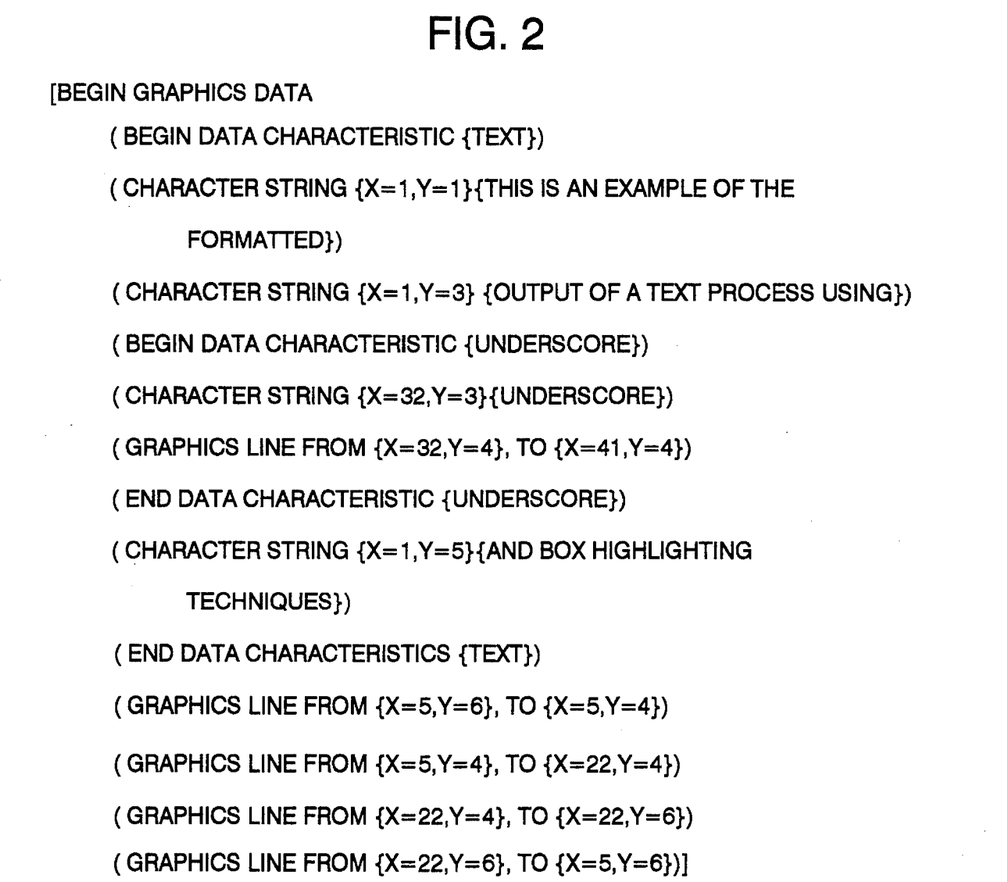
FIG. 2 is a representation of the presentation data stream created by tile text processor using the Begin/End Data Characteristics controls.

FIG. 2 shows the data stream that the text process can generate using the Begin/End Data Characteristics to delimit portions which use a limited set of graphics controls and control sequences. In FIG. 2, the data stream is represented symbolically in human readable form. The data stream is contained between the square brackets []. The individual controls of the data stream are contained within the parentheses (). Parameters of the controls are contained within the curly brackets {}. FIG. 2 describes the presentation data stream for representing the text presentation in FIG. 1.

The data stream begins with a Data Characteristics control with an ID of {Text}. This control is generated by the text processor because it recognizes from internal control structures that the subsequent data stream content will be limited to those controls and control sequences which represents text data. The text processor then generates a Character String control at the first text presentation at location {x=1, y=1}. This control specifies the characters for the first line of text. The next control generated by the text processor is also a Character String control. It specifies the text characters occurring at the beginning of the second line of output {x=1,y=3}. The text processor recognizes from internal control structures, that the last word on the second line is underscored. Therefore it generates a Begin Data Characteristics order of ID {Underscore}. This is followed by a Character String order representing the characters to be underscored. Finally, a Graphics Line order is generated specifying that a line should be drawn between points which are aligned under the position of the characters specified in the previous Character String control. Having specified all elements of the underscore sequence in graphical terms, the text processor generates an End Data Characteristics control of ID {Underscore}. The next control is a Character String control specifying the characters of the third line of the text presentation. This is followed by an End Data Characteristic control of ID {Text}. This specifies that the special ordering for text data has ended. This is followed by the Graphics Line controls which specify the graphic line segments describing the presentation of box highlighting in FIG. 1. This terminates the example data stream.

Figure 3:
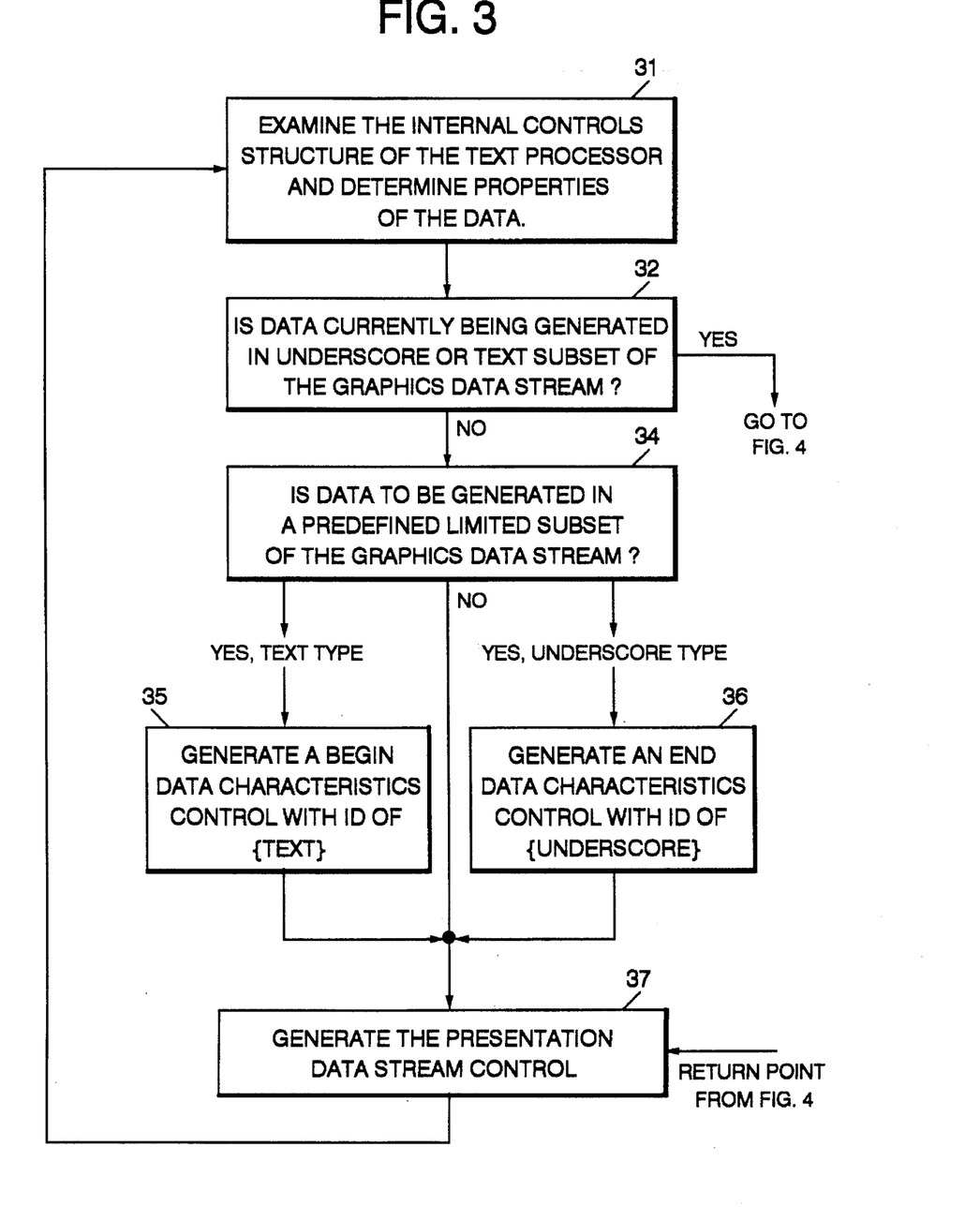
FIG. 3 is a flow diagram of the generation process of a Begin/End Data Characteristic control.
Figure 4:
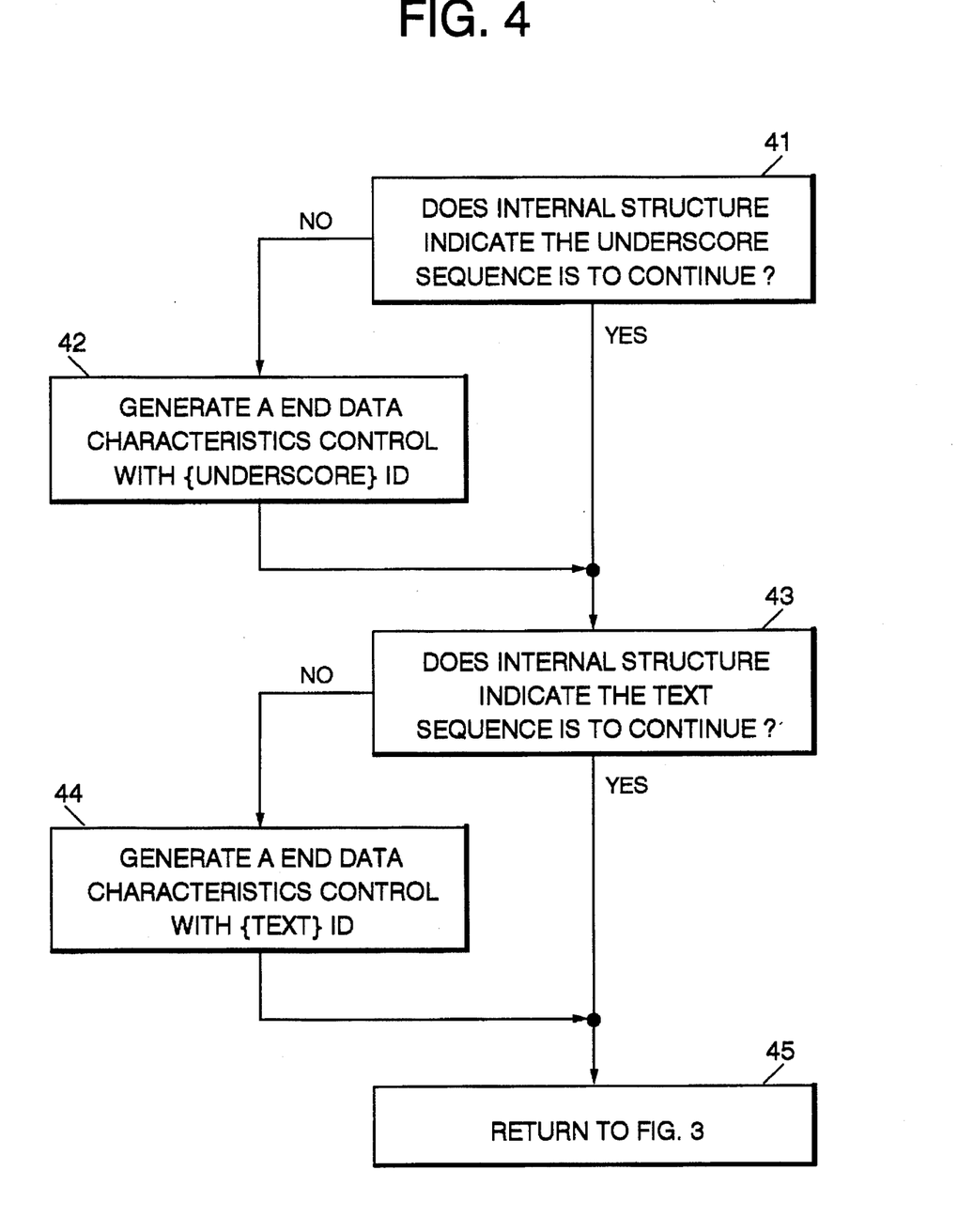
FIG. 4 is a continuation of the flow diagram of the generation process of FIG. 3.

FIGS. 3 and 4 show the flow diagrams for the generation of the data stream in FIG. 2. These figures represent a control process routine which has access to the internal format of the text processor and which in turn, tests the characteristics of that internal format and produce a graphical presentation data stream. Beginning with block 31 in FIG. 3, a text processor has been requested through a user interface or other request means, to produce a graphical presentation data stream for the information that has been captured from key strokes or other means. The information is contained in an internal format known to the text processor. In block 31, a portion of the internal format is examined by the text processor to determine if the data stream may be generated in one of the pre-defined subsets for text or underscore. Once the characteristics of the portion of the internal format are determined, the process in block 32 checks to see if the underscore or text subset has previously been identified and is currently being generated. In the case of an initial start up of the process, this condition is not met, and control passes to block 34. In block 34, the results of the analysis in block 31 are checked. If it is determined that the internal format supports text type, at block 35 the Begin Data Characteristic control with ID of {Text} is inserted in the graphical data stream, and flow passes to block 37, where the graphical controls representing the internal form are inserted in the graphical data stream. If at block 34, it is determined that the internal format supports the underscore mode, at block 36 the Begin Data Characteristic control with ID of {Underscore} is inserted in the graphical data stream, and flow passes to block 37, where the graphical controls representing the internal form are inserted into the graphical data stream. If at block 34, it is determined that neither the text nor underscore modes are indicated by the internal data, flow passes directly to block 37, where the graphical controls representing the internal form are inserted into the graphical data stream. Thus, the graphical data stream is generated with Begin Data Characteristic controls as required. Following the generation of the graphical data stream in block 37, flow return to block 31 where another portion of the internal data stream is analyzed.

If at block 32, it is determined that the underscore or text subset of the graphical data stream is currently being generated, as established in block 34, then process flows to FIG. 4, block 41. At block 41, the results of the analysis in block 31 are checked. If it is determined that the next portion of internal format continues in underscore mode, flow passes to block 43. At block 43 the results of the analysis in block 31 are checked. If it is determined that the next portion of internal format continues in text mode, flow passes to block 45, which returns control to FIG. 3, block 37, where the graphical controls representing the internal form are inserted into the graphical data stream. If at block 41 it is determined that the internal form no longer requires an underscore mode, at block 42 the End Data Characteristic control of ID {Underscore} is inserted into the graphical data stream, and flow is passed to block 43. If at block 43 it is determined that the internal form no longer requires a text mode, at block 44 the End Data Characteristics control of ID {Text} is inserted into the graphical data stream and flow is passed to block 45. As before, block 45 returns control to FIG. 3, block 37, where the graphical controls representing the internal form are inserted into the graphical data stream. Thus, the graphical data stream is generated with End Data Characteristic controls as required. Following the generation of the graphical data stream in block 37, flow return to block 31 where another portion of the internal data stream is analyzed. This cycle continues until all portions of the internal form have been analyzed.

Figure 5:
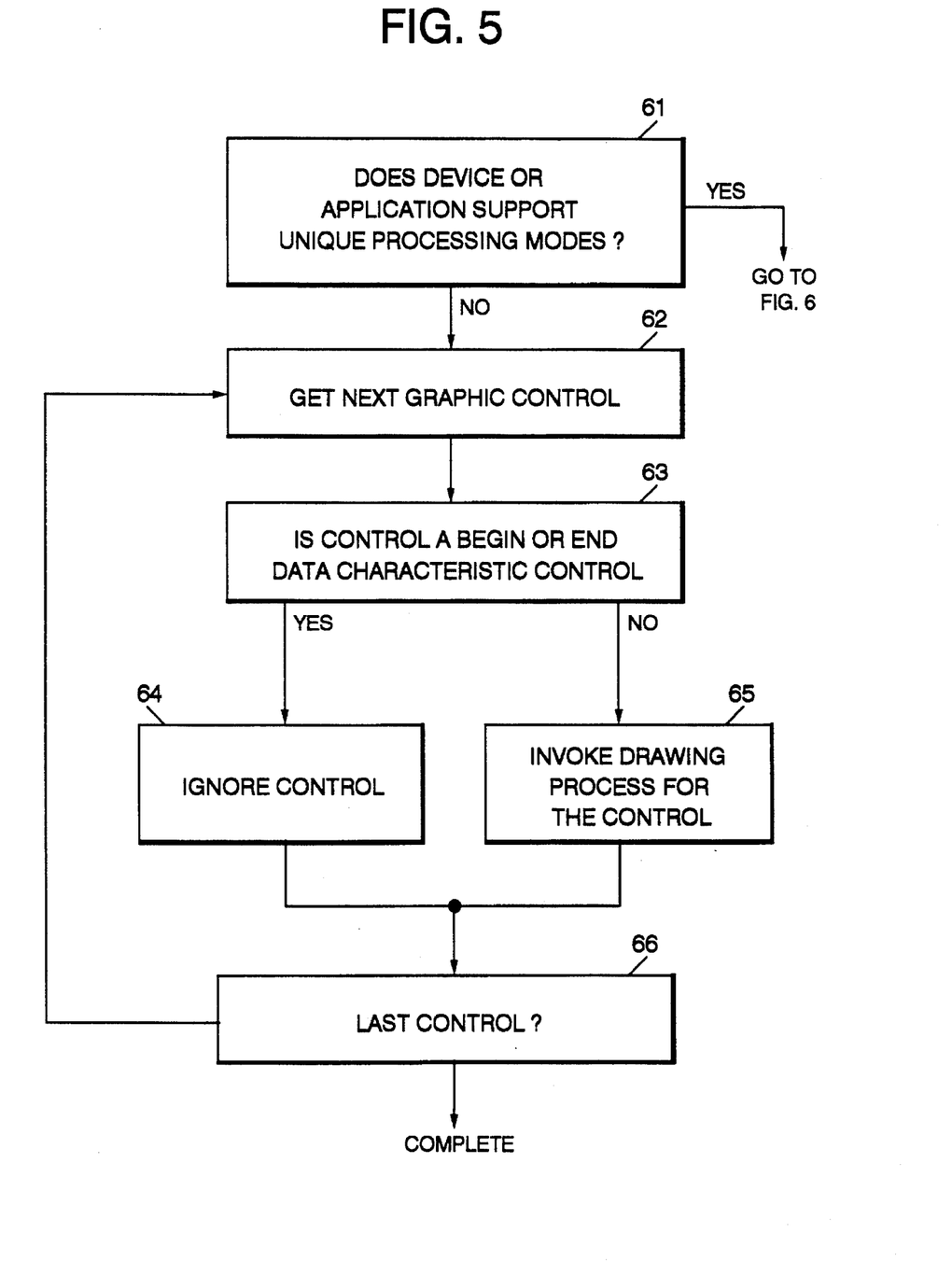
FIG. 5 is a flow diagram of the receiving process of a Begin/End Data Characteristic control.
Figure 6:
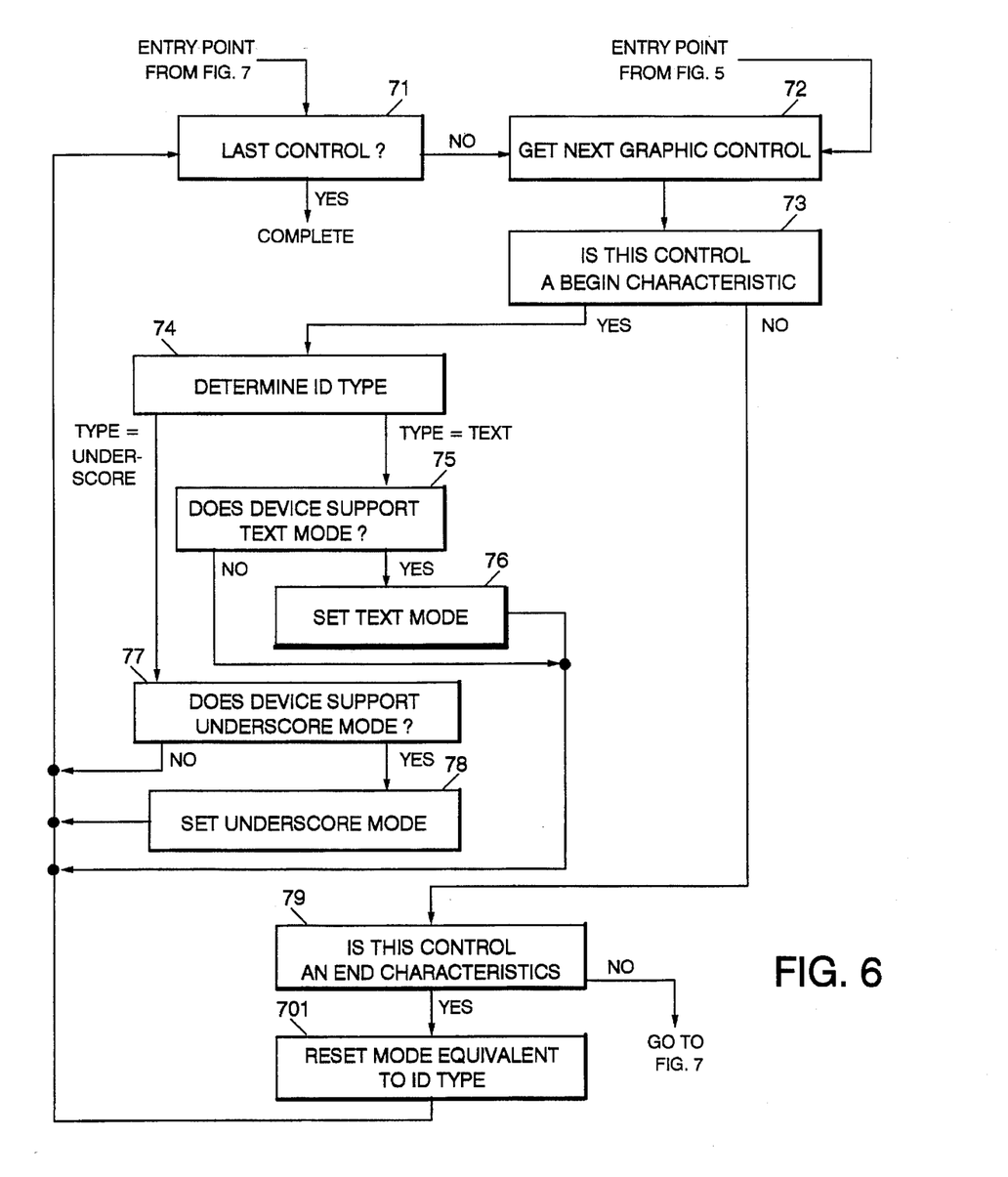
FIG. 6 is a continuation of the flow diagram of the receiving process of FIG. 5.
Figure 7:
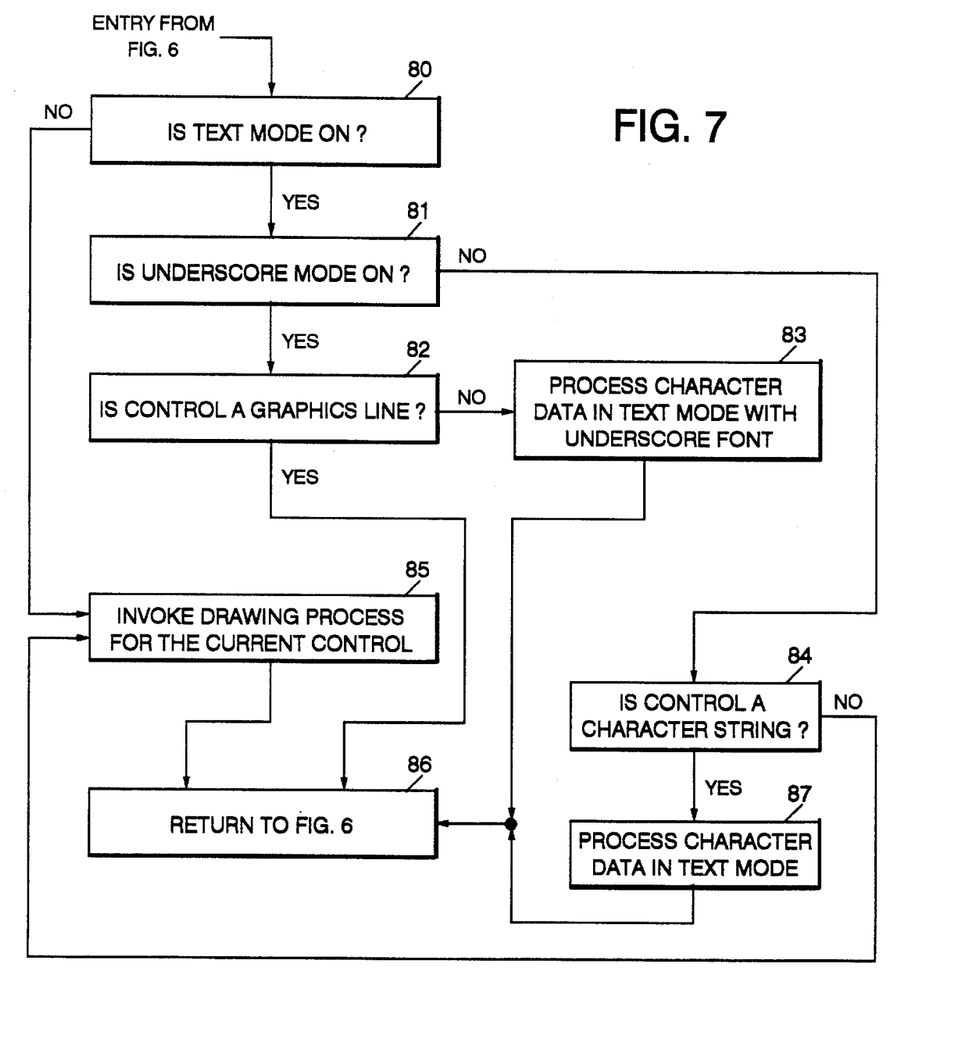
FIG. 7 is a continuation of the flow diagram of the receiving process of FIG. 6.

FIGS. 5 through 7 show the flow diagrams for the interpretation of the data stream in FIG. 2. These figures represent a control process routine which has access to the graphical presentation data stream generated by the process shown in FIGS. 3 and 4 and which in turn, test the characteristics of that data stream and produce a visual result through a drawing process typical of vector graphic data interpretation. Beginning in FIG. 5, at block 61 there is a determination of the characteristic of the device upon which the presentation described in the data stream is to be viewed. If the device does not support unique processing modes, as in the case of class 'C' printers, flow passes to block 62. At block 62 a control is extracted from the data stream. At block 63, the control is examined to determine if it is a Begin or End Data Characteristics control. If it is neither, at block 65 the drawing process is invoked to execute the graphical control, and flow passes to block 66. If the control is a Begin or End Data Characteristics control, at block 64 this control is ignored as it has no effect on the class 'C' device, and flow passes to block 66. At block 66, the data stream is interrogated to determine if the last control has been processed. If the last control has been processed, the process is complete. If not, flow returns to block 62 where the next control in the data stream is processed. Therefore, a process is available to ignore the Begin/End data characteristic controls.

If it is determined in block 61 that a receiving device has unique processing modes, flow passes to FIG. 6. At FIG. 6 block 72, a control is extracted from the data stream. At block 73, the control is examined to determine if the control is a Begin Characteristic control. If it is, at block 74 the ID of the Begin Characteristic control is determined. If it is a {Text} type, control is passed to block 75 it is determined if the current device supports a text mode. If it does not, flow passes to block 71, where the data stream is interrogated to determine if the last control has been processed. If at block 75, it is determined that the device does support text mode, an indicator is set at block 76 indicating that text mode has been entered, and flow is passed to block 71. If at block 74, it is determined that the type is {Underscore}, flow passes to block 77. At block 77 if it is determined that the device does not support an underscore mode, flow passes to block 71. This would be the flow for class 'A' printers, as that class does not support an underscore mode. If at block 77, it is determined that the device does support an underscore mode, at block 78 an indicator is set indicating that underscore mode has been entered, and flow is passed to block 71. This would be the flow for class 'B' printers, as that class supports an underscore mode. At block 71, the data stream is interrogated to determine if the last control has been processed. If it has, the process is complete. If not, flow returns to block 72 where the next control in the data stream is processed. Therefore, a process is available to set processing modes depending on the processing capabilities of the processing device and the content of the data stream.

If at block 73, it is determined that the control being examined is not a Begin Characteristic control, flow passes to block 79. If at block 79, it is determined that the control is an End Characteristic control, then at block 701 the mode determined by the ID of the End Characteristic control is reset, and flow passes to block 71. If at block 79, the control is not an End Characteristic control, flow passes to FIG. 7. Therefore, a process is available to reset the processing modes depending on the contents of the data stream.

Turning to FIG. 7, at block 80 the state of the text mode is checked. If it is not on, control is passed to block 85 where the drawing process is invoked to execute the graphical control, and flow passes to block 86, which causes a return to FIG. 6, block 71. If text mode is set, then at block 81 the state of the underscore mode is checked. If it is not on, flow passes to block 84 where it is determined if the control is a Character String control. If it is not, then special processing does not occur and control passes to block 85 where the drawing process is invoked to execute the graphical control. If block 84 detects a Character String control, then the control will be interpreted in the text mode process at block 87 rather than in the graphics drawing process at block 85. It is the process at block 87 that enables higher performance and quality of character string data interpretation. Such is the case in class 'A' printers, where only the text functions are specially processed and other controls are processed in graphics mode.

If at block 81 it is determined that underscore mode is set, control is passed to block 82 where it is determined if the control is a Graphics Line control. If it is, then processing continues at block 86 which returns to FIG. 6, block 71. This operation causes the Graphics Line control to be ignored because, in underscore mode, the actual underscore is visualized by alternate means. That is, at block 82, if the control is not a Graphics line control, it may be assumed to be a Character String control as text mode was established in block 80. Therefore at block 83, the Character String control is interpreted in the text mode process using a font which has the underscore designed as an integral part of the image of the characters of the font. From block 83, flow is through block 86 to FIG. 6, block 71. Such is the case in class 'B' printers, where the text function includes the ability to handle underscore as an integral part of text mode.

In summary, this invention provides a method of generating a graphical presentation data stream having special controls/hints which permit a receiver to identify where certain limitations have been used during the generation of the data stream. The controls/hints consist of a begin data characteristic control and an end data characteristic control. The began data characteristic and end data characteristic controls are positioned in the presentation data stream and are received and processed by a receiving application or device. The receiver may modify the presentation process for a particular output device when it recognizes a specific begin data characteristic control. The modification process will remain in effect until the associated end data characteristic control is encountered. An identification (ID) field is part of each begin data characteristic control and end data characteristic control. The ID field is used to define the specific process used to generate the delimited portion of the data stream. A registry of ID fields is assumed. Future data stream generators defining new limitations on output data streams and new devices adapting to these limitations, may have their new ID fields added to the registry.

While the invention has been shown and described with reference to a particular embodiments thereof, it will be understood by those skilled in the art that the foregoing and other changes in form and details may be made therein without departing from the spirit and scope of the invention.

What I claim is:

1. A method of interpreting a presentation data stream having limitations created by a generator employing a specific process, so that a plurality of receivers adaptable to the limitations of said presentation data stream achieves the most efficient presentation of said presentation data stream for a selected one of said receivers; said method comprising the steps of:

detecting a begin data characteristic control indicating the beginning of limitations within said presentation data stream and an end data characteristic control indicating the end of limitations within said presentation data stream;

detecting an identification field for said begin data characteristic control and said end data characteristic control defining the specific process used to generate the limitations within said presentation data stream;

determining for said selected one of said receivers a presentation mode based on the limitations within said identification field in said presentation data stream; and outputting said presentation data stream in said presentation mode for said selected one of said receivers.

2. The method of claim 1 wherein said determining step identifies a text mode as the presentation mode for said limitations within said presentation data steam.

3. The method of claim 1 wherein said determining step identifies an underscore mode as the most efficient presentation mode for said presentation data stream.

4. A method of creating a presentation data stream in a generator control process routine having a plurality of data characteristics received and sensed by a plurality of receivers, a selected one of said plurality of receivers making a determination of limitations made to said graphical presentation data stream based upon a combination of said plurality of data characteristics; said method comprising the steps of:

generating a begin data characteristic control within said graphical presentation data stream in said generator control process routine indicating the beginning of said limitations within said graphical presentation data stream;

generating an end data characteristic control within said graphical presentation data stream in said generator control process routine indicating where said limitations have ended; and generating an identification field for said begin data characteristic control and said end data characteristic control in said generator control process routine to define a specific process used to generate said limitations within said presentation data stream.

5. A method of generating a presentation data stream having text, vector graphics, and rester image data; said presentation data stream being modifiable using a specific process to create a limited ordering of said presentation data contents by a generator control process routine such that a receiver may identify where said limited ordering has occurred, said method comprising the steps of:

generating a begin data characteristic control by said generator control process routine within said presentation data steam indicating subsequent data stream contents represents said text data;

generating an end data characteristic control by said generator control process routine within said presentation data stream indicating said text data has ended; and generating an identification (ID) field for said begin data characteristic control and said end data characteristic control by said generator control process routine used by said receiver to determine said specific process used to create said limited ordering of said presentation data stream.

* * * * *